Figure 1:
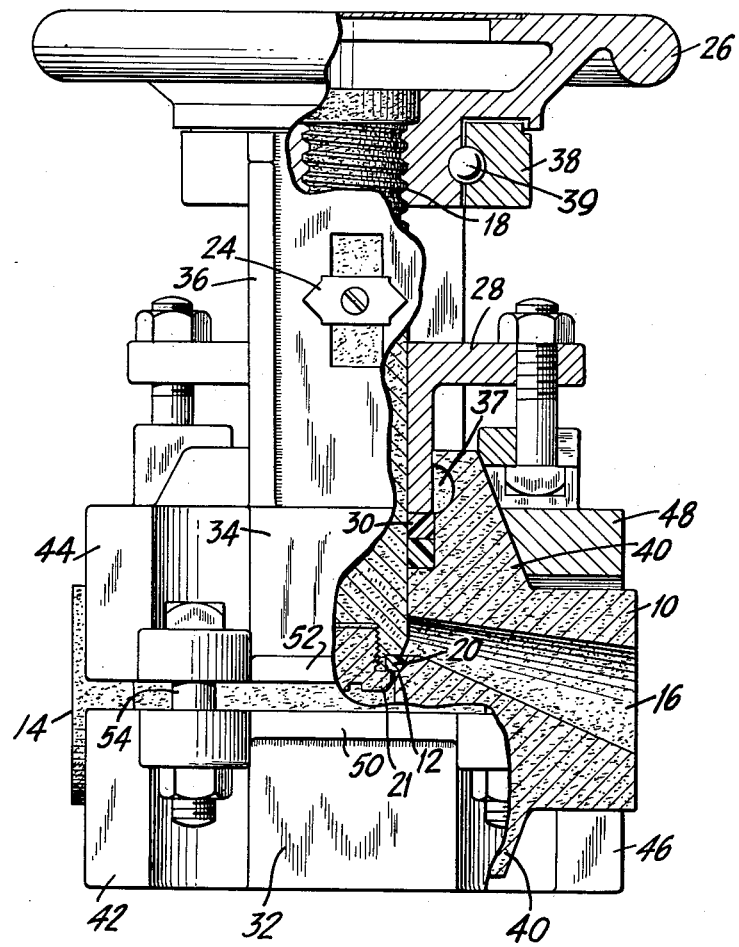

July 17, 1962  S. H. S. RAUB ETAL  3,044,489
ARMORED VALVES
Filed Nov. 10, 1959  2 Sheets-Sheet 1

INVENTORS.
SAMUEL H. S. RAUB
WILLIAM J. ALTON
STARLING F. JOACHIM
WILLIAM W. PALMQUIST

BY *John F. Hohmann*
ATTORNEY.

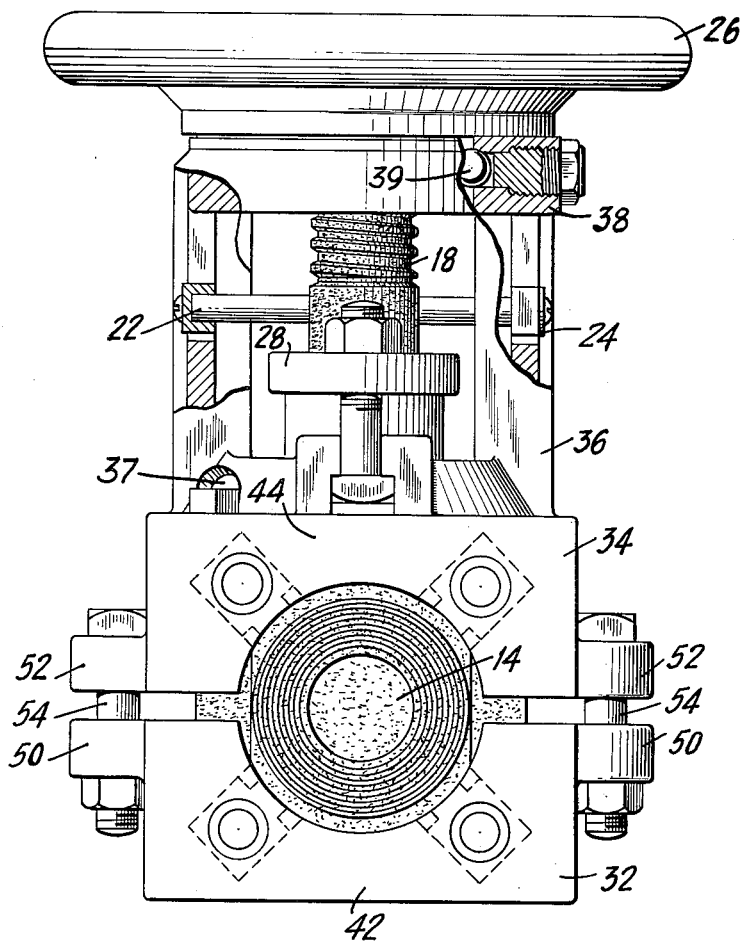

3,044,489
ARMORED VALVES
Samuel H. S. Raub, Bay Village, William J. Alton and Starling F. Joachim, Cleveland, and William W. Palmquist, Lakewood, Ohio, assignors to Union Carbide Corporation, a corporation of New York
Filed Nov. 10, 1959, Ser. No. 852,139
8 Claims. (Cl. 137—556.3)

This invention relates to corrosion resistant valves. It more particularly refers to corrosion resistant valves having mechanically strong armoring around the corrosion resistant valve material.

Impervious graphite is one of the most corrosion resistant materials presently in commercial use. It is used to make pipes, fittings, pumps, valves and many other articles which must operate in corrosive atmospheres or carry corrosive fluids. All this equipment made of impervious graphite stands up very well under corrosion wear. However, impervious graphite is an inherently weak material when subjected to tensile or flexural stresses and it must therefore be protected or reinforced against such stresses. It has been successfully proposed to protect impervious graphite equipment by armoring such. In the case of valves, this has been accomplished by making the body and spindle portions of the valve out of impervious graphite and encasing at least one body portion in a mechanically strong material.

Although this has been found to be generally adequate to protect the valve body against chipping, cracking, or even fracturing due to tensile or flexural stresses, it has sometimes happened that the armoring has been misaligned with the body portion upon assembly and has actually caused a combination of stresses severe enough to be responsible for damage to the body portion of the valve.

It is therefore the primary object of this invention to provide a corrosion resistant valve which is protected against substantially all tensile and flexural stresses.

It is another object of this invention to provide such a valve wherein the armoring thereon is prevented from itself causing damaging stresses.

Fulfilling these objects, this invention comprises an improved impervious graphite armored valve construction wherein the armoring is centered, aligned and seated on tapers extending outwardly from the body portion of the valve.

Understanding of this invention will be facilitated by reference to the accompanying drawings in which:

FIG. 1 is a side view partially in section of a valve made according to the invention; and FIG. 2 is a front view partially in section of the valve of FIG. 1 made according to the practice of this invention.

Referring to FIG. 1, the valve there shown is made up of a body portion 10, having a valve seat 12 therein between an inlet port 14 and an exhaust port 16; a spindle 18 with a spindle disk 20 suitably mounted to engage the valve seat 12 by means of a spindle cap 21, and a key 22 with an indicator 24 thereon; a wheel 26; a gland ring 28 adapted to hold packing 30 adjacent the spindle 18 to prevent leakage from the valve; a lower armoring member 32; and an upper armoring member 34 having a yoke 36, drainage means 37 including a saran pipe plug therein for use in plugging the end of a drainage tube, and a bearing mounting 38 as integral parts thereof. An important feature of this construction is the provision of tapers 40 on the valve body portion 10 which extend outwardly and engage corresponding portions of the armoring members 32 and 34 thereby properly aligning them with the body portion 10 and preventing flexural or tensile stresses from being built up during assembly due to misalignment.

In the construction herein disclosed, it is manifestly important that the fluid flowing through the valve contact only impervious graphite or other suitable corrosion resistant material and that the armoring material act only as such and not contact the fluid passing through the valve. The spindle disk should be somewhat resilient and therefore is preferably made out of a polymerized fluorinated olefin. The spindle, spindle cap, and body portion of the valve should be made of impervious graphite, and the armoring member or members, yoke, and bearing mounting should be made out of a mechanically strong material such as cast iron, for example. The wheel or other valve actuating device may be made of any convenient material commensurate with its functions and the fact that it contacts and drives the impervious graphite spindle.

One important feature of the valve of this invention is the fact that the spindle is non-rotating. This reduces the wear on the spindle, spindle disk, and packing. It also allows a key to be placed through the upper part of the spindle, which rides in the yoke, having an indicator thereon which shows the proportion of the valve opening which is in use.

Another novel feature of this valve resides in the spindle cap being so mounted as to be interchangeable with other spindle caps of various configurations so as to regulate the flow of fluid.

A further novel feature of the valve described herein is the fact that the hand wheel, or other member adapted to move the spindle and spindle disk into and out of engagement with the valve seat, is locked to the yoke by means of ball bearings and that this mounting provides for very low friction engagement of the hand wheel and the yoke and yet it positively locks the hand wheel against coming apart from the yoke.

While all of the above discussion has been based on and directed to a globe valve, it is intended that such type of valve be only exemplary of all valves. Every novel feature described herein is as much applicable to needle, gate, or any other type of valve as it is to globe valves with the exception of the interchangeability of spindle disks. Thus, an armored gate or needle valve may be constructed with tapers extending outwardly from the impervious graphite body portion thereof with the armoring members fitted thereon and aligned therewith. The spindle of any corrosion resistant valve may be made non-rotating and a key and indicator may be attached thereto as in the case of the globe valve.

In the use of these valves, the armoring members 32 and 34 are preferably equipped with flanged ends 42, 44, 46 and 48 in order to allow connection of the valve in a pipe line without having to attach anything to the impervious graphite body portion. These flanged ends are provided with slots indicated by the dotted lines in FIG. 2 to accommodate the bolt heads of bolts for connection to piping. The armoring members 32 and 34 are also provided with corresponding flanges 50 and 52 which may be suitably bolted together as shown at 54 thereby loading the body portion of the valve in compression.

Regardless of the other refinements and improvements incorporated in the valve according to this invention, however, the most important feature of this invention is the provision of tapers for centering and aligning the armoring members on the body portion of the valve.

What is claimed is:

1. In a valve comprising an impervious graphite body portion having a pair of armoring members in contact with the outer surfaces thereof; the improved construction wherein said body portion has at least one taper extending outwardly therefrom which supports said armoring members and wherein at least one of said armoring members has a taper corresponding thereto which aligns such with said body portion whereby to relieve said body portion of substantially all flexural and tensile stresses acting thereon, said armoring members being co-extensive with said body portion to an extent sufficient to be joined to inlet and exhaust pipes leading to and from said valve and including means exterior to said body portion for mounting said armoring members and said body portion together.

2. The improved valve described in claim 1 wherein an upper and lower armoring member is mounted to said body portion and wherein said means for mounting said armoring members and said body portion together comprises bolts mounted between said armoring members exterior to said body portion.

3. The improved valve described in claim 1 wherein said body portion operates in association with an impervious graphite spindle having a spindle disk which engages a valve seat in said body portion, and wherein means are provided for holding said spindle non-rotatable but slidably movable in a direction substantially perpendicular to the principal direction of fluid flowing through said valve.

4. The improved valve described in claim 3 wherein one of said armoring members has a yoke integral therewith and wherein said means comprises a key slidably mounted in said yoke and extending substantially perpendicularly through said spindle to prevent rotation of said spindle and also to act as an indicator of the amount of the valve opening.

5. A valve comprising a valve body having an inlet and an exhaust port therein and a valve seat therebetween; a non-rotating spindle having a spindle cap and a spindle disk which engages said valve seat thereby obstructing the flow of fluid through said valve; means for moving said spindle disk into and out of obstructing relation with said valve seat; packing between said valve body and said spindle to contain the fluid in said valve; a lower armoring member adjacent the base of said valve body extending from said inlet port to said exhaust port; an upper armoring member adjacent that portion of said valve body in proximity to said spindle and extending from said inlet port to said exhaust port, said upper armoring member having a slotted yoke extending therefrom which supportingly engages said moving means; means for mounting said armoring members and said body together; a key extending through said spindle and said slotted yoke, said key substantially preventing rotation of said spindle but allowing axial movement thereof; a gland ring secured to said upper armoring member to retain said packing between said valve body and said spindle; and at least one taper extending from said valve body into aligning relation with at least one of said armoring members.

6. The valve described in claim 5 wherein said valve body, said spindle and said spindle cap are each made of impervious graphite.

7. The valve described in claim 5 wherein said moving means is lockingly engaged to said yoke by ball bearings.

8. The valve described in claim 5 wherein drainage means is provided in a portion of said valve body adjacent said spindle and wherein said drainage means is provided with drain ports to allow the removal of fluid therefrom without such fluid passing out of said valve between said spindle and said valve body.

References Cited in the file of this patent
UNITED STATES PATENTS

| | | |
|---|---|---|
| 1,919,233 | Lee | July 25, 1933 |
| 2,535,953 | Powers | Dec. 26, 1950 |
| 2,903,236 | Holycross | Sept. 8, 1959 |
| 2,911,186 | Knox | Nov. 3, 1959 |

UNITED STATES PATENT OFFICE
CERTIFICATE OF CORRECTION

Patent No. 3,044,489

July 17, 1962

Samuel H. S. Raub et al.

It is hereby certified that error appears in the above numbered patent requiring correction and that the said Letters Patent should read as corrected below.

Column 1, line 27, for "one" read -- the --.

Signed and sealed this 20th day of November 1962.

(SEAL)
Attest:

ERNEST W. SWIDER
Attesting Officer

DAVID L. LADD
Commissioner of Patents